(12) United States Patent
Becktell (10) Patent No.: US 9,999,894 B2
(45) Date of Patent: Jun. 19, 2018

(54) TREE AND SHRUB SPRINKLER APPARATUS

(71) Applicant: Robert W Becktell, Hockley, TX (US)

(72) Inventor: Robert W Becktell, Hockley, TX (US)

( * ) Notice: Subject to any disclaimer, the term of this patent is extended or adjusted under 35 U.S.C. 154(b) by 43 days.

(21) Appl. No.: 15/146,218

(22) Filed: May 4, 2016

(65) Prior Publication Data

US 2017/0320074 A1 Nov. 9, 2017

(51) Int. Cl.
| | |
|---|---|
| *B05B 1/20* | (2006.01) |
| *A01G 25/02* | (2006.01) |
| *B05B 1/30* | (2006.01) |
| *B05B 15/06* | (2006.01) |

(52) U.S. Cl.
CPC ................ *B05B 1/20* (2013.01); *A01G 25/02* (2013.01); *B05B 1/3026* (2013.01); *B05B 15/063* (2013.01); *B05B 15/625* (2018.02)

(58) Field of Classification Search
CPC ......... B05B 1/20; B05B 1/3026; B05B 1/185; B05B 15/063; A01G 25/02
USPC ....... 239/273, 285, 279, 280, 248, 556, 557, 239/565–568, 587.5, 581.1
See application file for complete search history.

(56) References Cited

U.S. PATENT DOCUMENTS

| | | | | |
|---|---|---|---|---|
| 1,011,934 A * | 12/1911 | Fellows | ................ | B05B 3/0422 239/240 |
| 1,788,500 A * | 1/1931 | Uhri, Jr. | .................. | F16L 39/04 239/587.5 |
| 2,066,531 A * | 1/1937 | Holden | ...................... | B05B 3/06 239/248 |
| 2,883,133 A * | 4/1959 | Zarate | ..................... | E04H 12/32 248/174 |
| 4,010,898 A | 3/1977 | Williams | | |
| 4,317,539 A * | 3/1982 | Pollock | ................... | A01G 25/02 137/236.1 |
| 4,519,544 A * | 5/1985 | Szabo | ..................... | B05B 15/60 239/279 |
| 4,778,111 A * | 10/1988 | Leap | ....................... | B05B 1/205 239/536 |
| 4,901,927 A * | 2/1990 | Valdivia | ................ | B05B 1/1636 137/883 |
| 5,117,582 A | 6/1992 | Cissel, Jr. et al. | | |
| 5,285,968 A * | 2/1994 | McSheehy | ............. | A01G 25/02 239/273 |
| 5,934,563 A * | 8/1999 | Gapco | ..................... | B05B 3/026 239/258 |
| 6,619,565 B1 * | 9/2003 | Abbott | ................... | A01G 25/02 239/273 |
| D490,499 S * | 5/2004 | Martin | ........................ | D23/214 |

(Continued)

OTHER PUBLICATIONS

Waterhoop Product Advertisement.

*Primary Examiner* — Darren W Gorman
*Assistant Examiner* — Joseph A Greenlund
(74) *Attorney, Agent, or Firm* — Kenneth L. Nash; Thomas D. Nash (57) ABSTRACT

A tree sprinkler comprising curved articulating watering extensions pivotally connected to a central tubular housing, allowing the sprinkler to be placed around the trunk of a tree. The pivotal connections allow the extensions to open to any size. The extensions are preferably rigid and have nozzles or the like to spray the trunk of the tree or shrubs. The extensions may be removable and/or extendable to accommodate varying sizes of trees or shrubs.

18 Claims, 5 Drawing Sheets

(56) References Cited

U.S. PATENT DOCUMENTS

| | | | | |
|---|---|---|---|---|
| 6,901,698 B2* | 6/2005 | Manning | ............... | A01G 25/02 |
| | | | | 138/139 |
| 6,976,644 B2* | 12/2005 | Troudt | ............... | B05B 15/652 |
| | | | | 239/587.1 |
| 7,337,982 B1* | 3/2008 | Spevak | ............... | A01G 25/02 |
| | | | | 239/1 |
| 7,950,599 B1* | 5/2011 | Burkhardt | ............... | B05B 1/30 |
| | | | | 239/581.1 |
| 8,443,228 B2* | 5/2013 | Lehr | ............... | G06F 9/526 |
| | | | | 714/11 |
| 8,565,925 B2* | 10/2013 | Lips | ............... | A01C 23/042 |
| | | | | 222/1 |
| 8,695,902 B2* | 4/2014 | Mayher | ............... | B05B 1/3026 |
| | | | | 239/600 |
| 8,727,237 B2* | 5/2014 | Natterer | ............... | B05B 1/26 |
| | | | | 239/265 |
| 9,504,210 B2* | 11/2016 | Ford | ............... | A01G 25/02 |
| 2008/0035766 A1* | 2/2008 | Belz | ............... | A01G 25/02 |
| | | | | 239/726 |
| 2015/0250110 A1* | 9/2015 | Lo | ............... | F16L 3/127 |
| | | | | 239/276 |
| 2017/0320074 A1* | 11/2017 | Becktell | ............... | B05B 1/20 |

* cited by examiner

TREE AND SHRUB SPRINKLER APPARATUS

BACKGROUND OF THE INVENTION

Field of the Invention

The present invention relates generally to sprinkler and irrigation systems and, more specifically, to a tree and shrub sprinkler with curved articulating watering extensions allowing the sprinkler to be placed around the trunk of a tree or a shrub.

Background of the Invention

Irrigation systems and sprinklers are well known for lawn and tree maintenance. In most climates, and more particularly in hot, dry areas, proper watering is crucial to maintain the health of the landscape. Sprinklers are a common tool to distribute water to the vegetation by providing water evenly in a generally circular or rectangular fashion. The total area covered depends on the water pressure and various configurations of the particular sprinkler. During drought conditions water use is oftentimes heavily regulated and restricted, so efficient use of the water allotted is critical. This is oftentimes referred to as a "water conservation period". Overwatering may not only be environmentally harmful, leading to fungus or insect infestations, but also results in a substantial cost, particularly during water conservation periods whereby additional costs and fees are assessed for using more than the allotted volume of water for watering purposes.

This is specifically true for trees and shrubs, which may require varying watering needs compared to nearby vegetation. Supplying the proper amount of water for trees can be challenging, given the varying sizes and shapes of trees and their close proximity to other plants or trees requiring less water. Some are wide, requiring the sprinkler to be repositioned multiple times to evenly water the surrounding ground. Shrubs and seedlings may need increased water during certain periods, while less during others.

Rotary sprinklers, which are mainly used for watering lawns and gardens, are designed to operate at medium to high water volumes. If the water volume is turned down too low, most of the rotary designed sprinklers will not operate properly and will have a tendency to stall in one position and not rotate back and forth. This can be a problem when watering newly planted trees which need water in a small contained area at low volumes.

Oscillating sprinklers are generally designed to be used for lawns and gardens, and most do not operate at low water volumes. Oscillating sprinklers typically shoot volumes of water in both an upward and outward pattern in order to cover large areas. Often this method of watering sprays water on the fruit and leaves of trees and shrubs increasing the risk of fungal diseases.

Dropping a garden hose near the base of a tree and turning the faucet to a very low water volume is especially common when watering newly planted and young trees. However, often the water is concentrated on one side of the tree while the opposite side may lack the ideal amount of water. Irrigating a 360 degree zone around the tree is preferable as it encourages root growth in all directions.

Another popular method of watering is the soaker hose. This method entails wrapping the hose in a spiral pattern around the base of the tree. This may not be a concern for a single tree, however, when one has many trees to water it can be a time consuming event to unwrap the soaker hose from one tree and wrap it around the next. Another disadvantage is, as the tree grows, more and more soaker hose is required to effectively reach the areas that need to be watered. With newly planted trees, shrubs or plants it can be difficult to purchase a standard length soaker hose that is short enough to accommodate the limited area that needs to be watered. If the soaker hose is too long, too many wraps around in a tight area can apply water too quickly and cause water waste due to run off or the wraps can extend too far outside the root ball system which will not benefit the tree and result in water waste. When mowing the lawn, it is prudent to unwrap the soaker hose from around the tree so the hose does not get caught in the mower blades. This is both laborious and time consuming as the hose will have to be wrapped back around the tree after mowing. Grass around the tree can also be damaged if the soaker hose is left for a long period of time leaving an unsightly spiral imprint in the grass when the hose is removed.

A common solution to watering selected plants or areas are the low volume drip/sprinkler systems. Typically these units are on a long length of thin, plastic tubing lying within landscaping with the desired spray heads inserted into the tubing near plants or shrubs. Once in position, they are not easily moved and are crushed or severed if ran over by a mower.

There are a number of sprinklers or soakers systems designed for trees, shrubs, and other vegetation in the prior art. Previous attempts have used clunky, rigid configurations to be positioned around trees, requiring reconfiguration to accommodate trees of varying shapes and sizes. Still others fail to address the problem of increasing water irrigation for certain trees or shrubs, while preventing overwatering of other areas nearby.

The following patents discuss background art related to the above discussed subject matter:

U.S. Pat. No. 4,010,898 issued Mar. 8, 1977, to Williams, discloses a method and apparatus for distributing irrigation water and the like around agricultural plants. The apparatus includes a semi-permanent, semi-looped elastic distributing conduit having a closed end and an open end, with a plurality of spray nozzles in the upper surface of the conduit for distributing liquid outward from the plant in fan-like overlapping patterns.

U.S. Pat. No. 4,778,111, issued Oct. 18, 1988, to Leap, discloses an irrigation apparatus for controlled watering of large plants, such as trees, shrubs and the like. It includes a hose connection for connecting to a garden hose or the like, a control valve for adjusting the flow of water through the apparatus, a manifold connected at one end thereof to the valve and also being flow connected to a pair of tubular arms and a pair of weights attached to the tubular arms at distal ends thereof. The tubular arms are flexible and adapted to wrap around the base of a tree or the like and are held in place against thermal expansion or water pressure acting within the tubular arms by the weighted ends. The tubular arms also have a plurality of spaced apertures along upper sides thereof. The valve has two flow apertures, one of which provides fixed relatively low flow and the other which is adjustable to provide for variation in water flow.

U.S. Pat. No. 5,117,582, issued Jun. 2, 1992 to Cissel, Jr., et al., discloses a tree irrigator which utilizes at least a first flexible tree encircling container which may receive a substantial volume of a tree irrigating liquid and which will slowly disperse the liquid to the tree over a period of time. Each flexible container has at least a base portion which provides for the discharge of the irrigating liquid to the root ball of the tree. Either a single container may be placed about the trunk of the tree or two cooperating containers can be joined together in a tree encircling configuration.

U.S. Pat. No. 5,285,968, issued Feb. 15, 1994 to McSheehy, discloses a one-piece molded water chamber in the form of an annulus having a large open segment which permits the chamber to serve as a yoke which can be positioned on the ground surrounding the trunk of small trees at the base of the trunk. The water chamber is made of a strong, semi-rigid material so that the segmental opening can be spread apart to permit it to fit around a tree trunk which may be somewhat larger in diameter than the size of the open segment. The chamber is continuously fed with water from a standard garden hose. The wall of the chamber is pierced with a single row of water orifices which are distributed along a line around the upper, outer diameter of the annular body. This arrangement permits the watering of a tree outward, around the drip-line beneath the tree's outer foliage. In addition, this arrangement also prevents introducing water into the soil around the region immediately surrounding the tree trunk. This watering pattern is specifically intended to prevent disease and decay of growing trees prior to reaching their full-grown state.

U.S. Pat. No. 6,901,698, issued Jun. 7, 2005, to Manning, discloses an irrigation device and irrigation system. More specifically, the present invention is directed to a weep or tear type irrigation device and irrigation system which uses a bendable support to keep a flexible soaking hose in a desired configuration. The support may be used inside the hose, outside the hose, or within the walls of the hose.

U.S. Pat. No. 8,727,237, issued May 20, 2014, to Natterer, discloses an adjustable sprinkler system which distributes water from a garden hose through a feed housing to a pair of pivotally attached arms. There is a sprinkler unit attached near the end of each arm. Each sprinkler unit has an interchangeable spray head attached that is specific to the desired watering pattern. By pivoting the arms away from one another, the sprinkler system is placed on either side of the base of the shrub or tree to be watered. This adjustable sprinkler system accommodates newly planted and existing small to large and short to tall trees and shrubs, provides a multitude of spray patterns at varying water volumes, and minimizes water waste.

U.S Patent Application No. 2008/0035766, published Feb. 14, 2008, to Belz, discloses a water sprinkling apparatus primarily for trees which includes a branched piping manifold in a substantially horizontal plane and forming a predetermined pattern, such as a U, an H, or a Y. At least three pipe fittings are disposed along the branched piping manifold to provide attachment of at least two sprinkler heads removably screwed into the pipe fittings. A common garden hose connection also attaches to the manifold and provides water supply to all the attached spray nozzles, which preferably offer adjustable spray patterns and distances.

There exists a need for an improved tree and shrub sprinkler that addresses the problems discussed hereinbefore. Consequently, those skilled in the art will appreciate the present invention.

SUMMARY OF THE INVENTION

A primary object of the present invention is to provide an improved tree and shrub sprinkler apparatus.

Another object of the present invention is to provide an improved sprinkler apparatus that waters the entire tree structure around the trunk of the tree.

These and other objects, features, and advantages of the present invention will become clear from the figures and description given hereinafter. It is understood that the objects listed above are not all inclusive and are only intended to aid in understanding the present invention, not to limit the bounds of the present invention in any way.

The present invention provides a tree and shrub sprinkler apparatus that may comprise a base and a sprinkler housing fixedly attached to the base. The sprinkler housing defines an internal flow path with a housing inlet in fluid communication with a housing outlet.

A first watering arm and a second watering arm each comprise a rigid hollow, curved articulating member extending outwardly from the sprinkler housing. The first watering arm and the second watering arm may comprise a plurality of watering orifices. The first watering arm may further comprise a first arm connection with the housing outlet for pivotal movement around the housing outlet. The second watering arm may further comprise a second arm connection with the housing outlet for pivotal movement around the housing outlet.

In one embodiment, the housing outlet extends vertically upwardly when mounted on the base for operation. The housing outlet may further comprise a hollow cylindrical member with at least a first arm orifice and at least a second arm orifice. The first arm orifice aligns with the first arm connection and the second arm orifice aligns with the second arm connection. A tubular first arm connector surrounds the first arm orifice. A tubular second arm connector surrounds the second arm orifice, whereby the housing outlet feeds water from the housing inlet to the tubular first arm connector to the first watering arm and to the tubular second arm connector to the second watering arm.

In one embodiment, the housing outlet is oriented vertically. The first arm connection and the second arm connection comprise first and second tubular members that are co-axially aligned with the housing outlet. The first and second tubular members rotate around the housing outlet.

At least one of the first watering arm and the second watering arm comprises a bended portion. The bended portion provides a clearance to allow the first watering arm and the second watering arm to pivot widely enough to receive a tree.

The plurality of watering orifices further comprises at least one of a nozzle or an adjustable sprinkler head.

In one embodiment, the first watering arm and the second watering arm can rotate 360 degrees with respect to the housing outlet.

A main control valve can be provided for controlling a flow of water into the sprinkler apparatus. A first arm valve and a second arm valve may be utilized to control water flow into the first and second arms. In one embodiment, the first watering arm and the second watering arm are extendable.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE INVENTION

Detailed descriptions of embodiments of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Sprinkler 100, may be referenced interchangeably as a watering aid, tree sprinkler, or shrub sprinkler consistent with the teachings herein. Tree sprinkler 100 comprises curved articulating watering extensions pivotally connected to a central tubular housing, allowing the sprinkler to be placed around the trunk of a tree. The pivotal connections allow the extensions to open to any size. In one embodiment, sprinkler 100 may be comprised of plastics, metals, or any other suitable material. In alternate embodiments, portions of sprinkler 100 may further comprise resilient, deformable material. In a preferred embodiment, the extensions are preferably rigid and have nozzles or the like to spray the trunk of the tree or shrubs. In a possible embodiment, sprinkler 100 is an elongated rigid tubular of a monolithic construction, while in alternate embodiments, sprinkler 100 may be constructed of various individual pieces configured as one.

Figure 1:
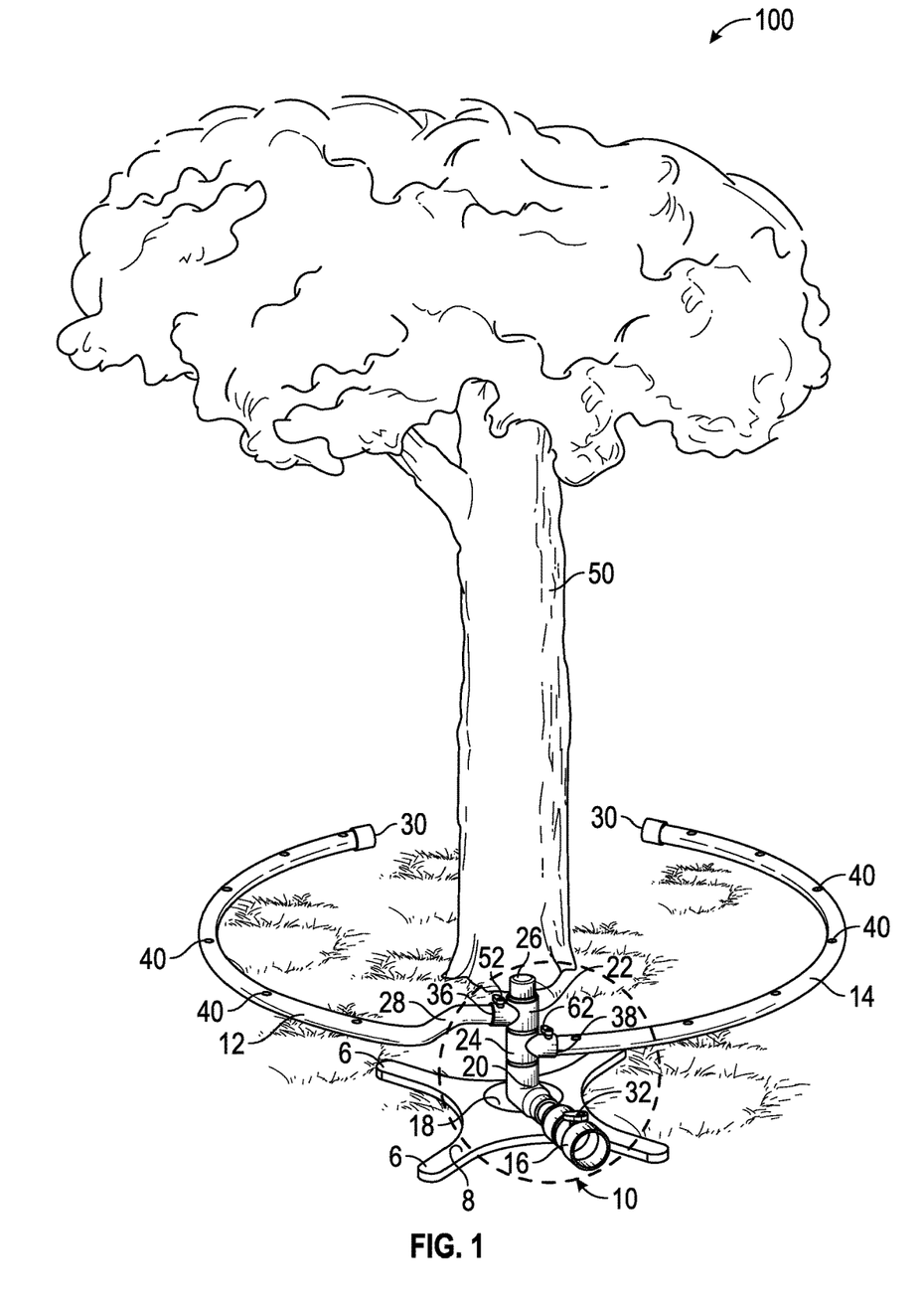
FIG. 1 is a perspective view of a tree and shrub sprinkler in an open position around a large tree in accord with one possible embodiment of the present invention.
Figure 5:
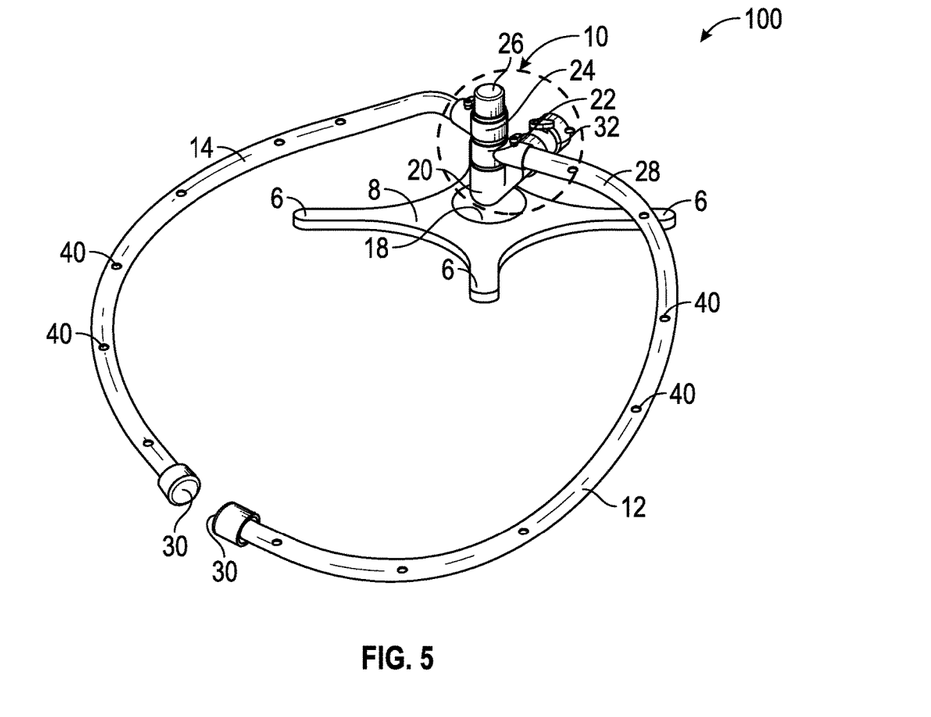
FIG. 5 is a perspective view of a tree and shrub sprinkler in a closed position in accord with one possible embodiment of the present invention.

Looking to FIGS. 1 & 5, tree sprinkler 100 is shown comprising first watering arm 12 and second watering arm 14 operatively connected to central housing 10 supported by base 8. Housing 10 comprises a rigid tubular housing which creates a flowpath for water to be distributed in accord with the present invention. Central housing 10 provides a hose connection to housing inlet 16 for connecting with a water source, such as a water hose or the like. Housing inlet 16 connects with angled connector 20 which diverts water to housing outlet 70 (See FIG. 6) in a perpendicular direction with respect to housing inlet 16. Angled connector 20 generally defines an "L-shaped" conduit for diverting water from housing inlet 16 to both first watering arm 12 and second watering arm 14. Cap 26 secures first watering arm 12 and second watering arm 14 in position with respect to each other and to angled connector 20. Valve 32 regulates the flow of fluid from housing inlet 16 into housing 10 and valves 52, 62 regulate the flow of water from housing 10 to first watering arm 12, and second watering arm 14, respectively. The inner configuration of housing 10 and the connections with first arm 12 and second arm 14 will be described in more detail herein in reference to FIG. 6.

In this embodiment, base 8 further comprises legs 6 and weight 18 to stabilize sprinkler 100 during operation. In other embodiment, base 8 may comprise more or less legs than those shown, no legs, and/or comprise different shapes, including, but not limited to, a circular shape, a hexagonal shape, a square shape, or the like. In other embodiments, alternative support measures may be used including, stakes, weights, and the like to secure sprinkler 100.

In a preferred embodiment, first watering arm 12 and second watering arm 14 are preferably rigid, curved, and articulating members each having nozzles 40 to disperse water to a desired area. In a preferred embodiment, nozzles 40 are spaced evenly along the lengths of first arm 12 and second arm 14. In alternate embodiments, nozzles 40 may comprise holes, orifices, or other means for dispersing water. In another embodiment, nozzles 40 may be movable to direct the water flow in a desired direction.

First arm 12 further comprises cap 30 on a distal end and watering arm connector 22 on an opposite end which pivotally connects first watering arm 12 to central housing 10 and closing the flowpath with cap 30. Similarly, second arm 14 comprises cap 30 on a distal end and watering arm connector 24 on an opposite end which pivotally connects second watering arm 14 to housing outlet 70.

In one possible embodiment, connectors 22 and 24 are rotatably mounted around tubular housing outlet 70 so that connections 36, 38 are pivotal to allow watering arms 12, 14 to open to any size. Connectors 22 and 24 are preferably tubular members. Connectors 22 and 24 may or may not comprise O-rings and the like that interface with tubular housing outlet. Connectors 22 and 24 preferably rotate independently and rotate with movement of first and second arms 12 and 14. Connectors 22 and 24 could be spaced apart if desired. Connectors 22 and 24 may comprise cylindrical portions at the top and the bottom with a height sufficient for multiple O-rings such as two O-rings at the top and the bottom of each connector. Other types of rotational seals may be utilized. In this embodiment, connectors 22 and 24 permit pivotal movement of first and second arms only in a horizontal plane.

Other types of pivotal water sealed connections could utilized. For example, cylindrical housing outlet 70 may comprise two cylinders or tubulars that are pivotal with respect to each other and inlet 16 so that there is no need for tubular connectors 22 and 24 mounted around housing outlet 70. Accordingly, the invention is not limited to any specific type of pivotal connections.

In one embodiment, watering arms 12, 14 may be extendable to accommodate varying sizes of trees or shrubs. In another embodiment, arms 12, 14 may be threadably removable from first arm connector 22 and second arm connector 24.

Figure 6:
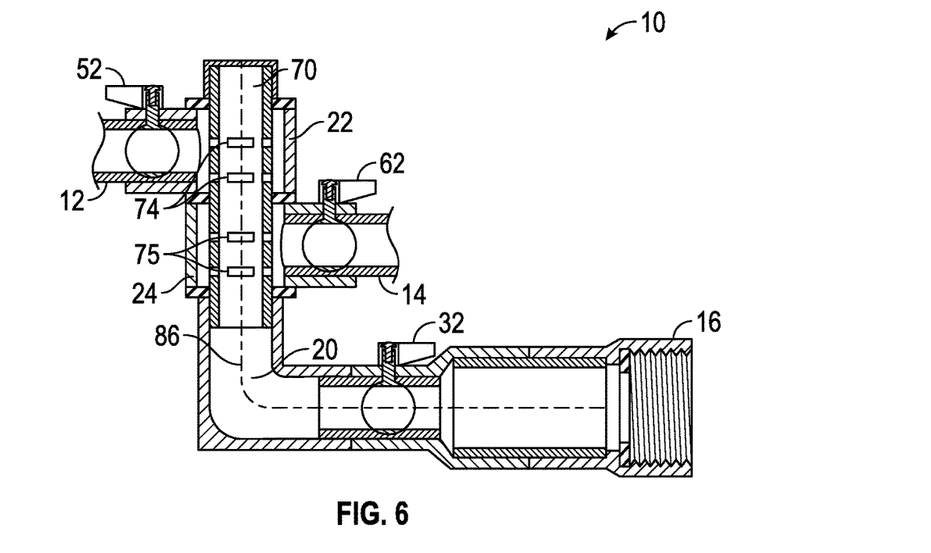
FIG. 6 is a side view diagram, partially in section, of a tree and shrub sprinkler in accord with one possible embodiment of the present invention.

In FIG. 6, the internal configuration of one possible non-limiting embodiment of housing 10 is depicted. Housing outlet 70 has a smaller diameter than angled connector 20, and first arm connector 22 and second arm connector 24 each rotatably mounted around housing outlet 70 with respect to housing 10 whereby first arm connector 22 and second arm connector 24 are in fluid communication with central housing 10 and watering arms 12, 14 respectively. While first arm connector 22 and second arm connector 24 are shown with radial spacing, the tubular body may be a closer fit, may be mounted with O-rings and may utilize multiple orifices 74, 75 to maintain fluid flow throughout the pivotal movement thereof.

Cap 26 seals the upper end of tubular housing outlet 70. A hose mates with inlet 16 and water flows through the horizontally oriented tubular housing inlet 16, main valve 32, angled connector 20, and the vertically oriented housing outlet 70 before escaping through outlet orifices 74, 75 which vertically align with first watering arm 12 and second watering arm 14, respectively, which may be referred to herein as first arm orifice and second arm orifices. Valves 52, 62 restrict the amount of water entering first watering arm 12 and second watering arm 14 so that a user can dictate the proper amount of watering, from a slow soak pace to more powerful streams. First arm connector 22 and second arm connector form seals around the vertically oriented housing outlet 70 to direct fluid flow into first watering arm 12 and second watering arm 14. Fluid flows along flowpath 86 from inlet 16 through outlet 70 before escaping through orifices 74 and 75 into first watering arm 12 and second watering arm 14, respectively.

Figure 2:
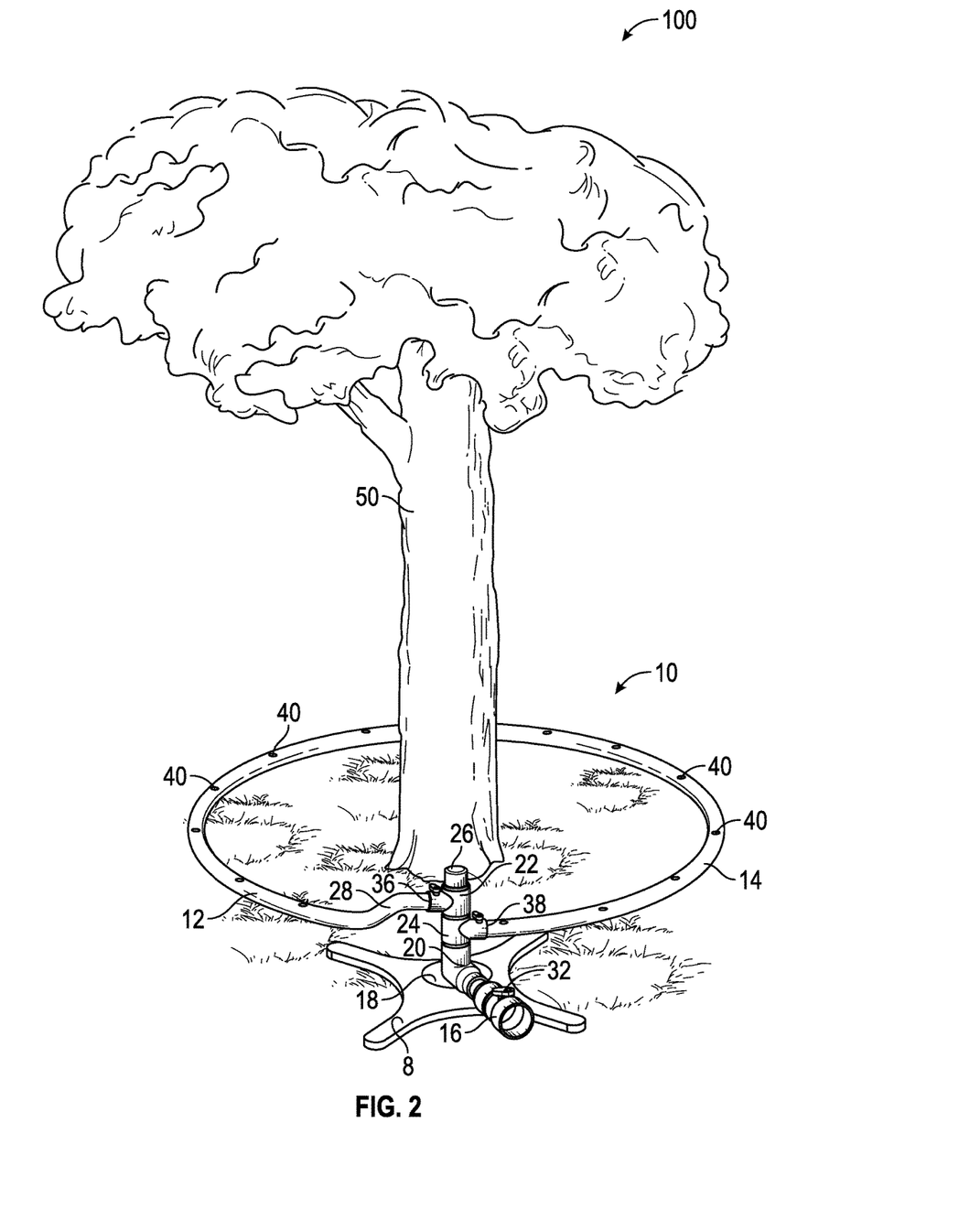
FIG. 2 is a perspective view of a tree and shrub sprinkler in a closed position surrounding a tree in accord with one possible embodiment of the present invention.

Looking to FIG. 1, sprinkler 100 is shown whereby first watering arm 12 and second watering arm 14 are in an open position to surround tree 50. In FIG. 2, sprinkler 100 is shown in a closed position whereby first watering arm 12 and second watering arm 14 are engaged to completely encircle tree 50. It should be noted that sprinkler 100 will operate as intended whether in an open or a closed position with respect to tree 50. In this embodiment, bend 28 in first watering arm 12 allows for first watering arm 12 and second watering arm 14 to fully open to accept tree 50 without contacting each other. In operation, sprinkler 100 is positioned as desired with respect to a tree or a shrub by opening first watering arm 12 and second watering arm 14 to be wide enough to surround tree 50 as shown in FIG. 1. A user connects a hose to housing inlet 16 and opens check valve 32 to allow fluid flow into sprinkler 100. Water travels through housing 10 and then through first watering arm 12 and second watering arm 14 before leaving through nozzles 40.

Figure 3:
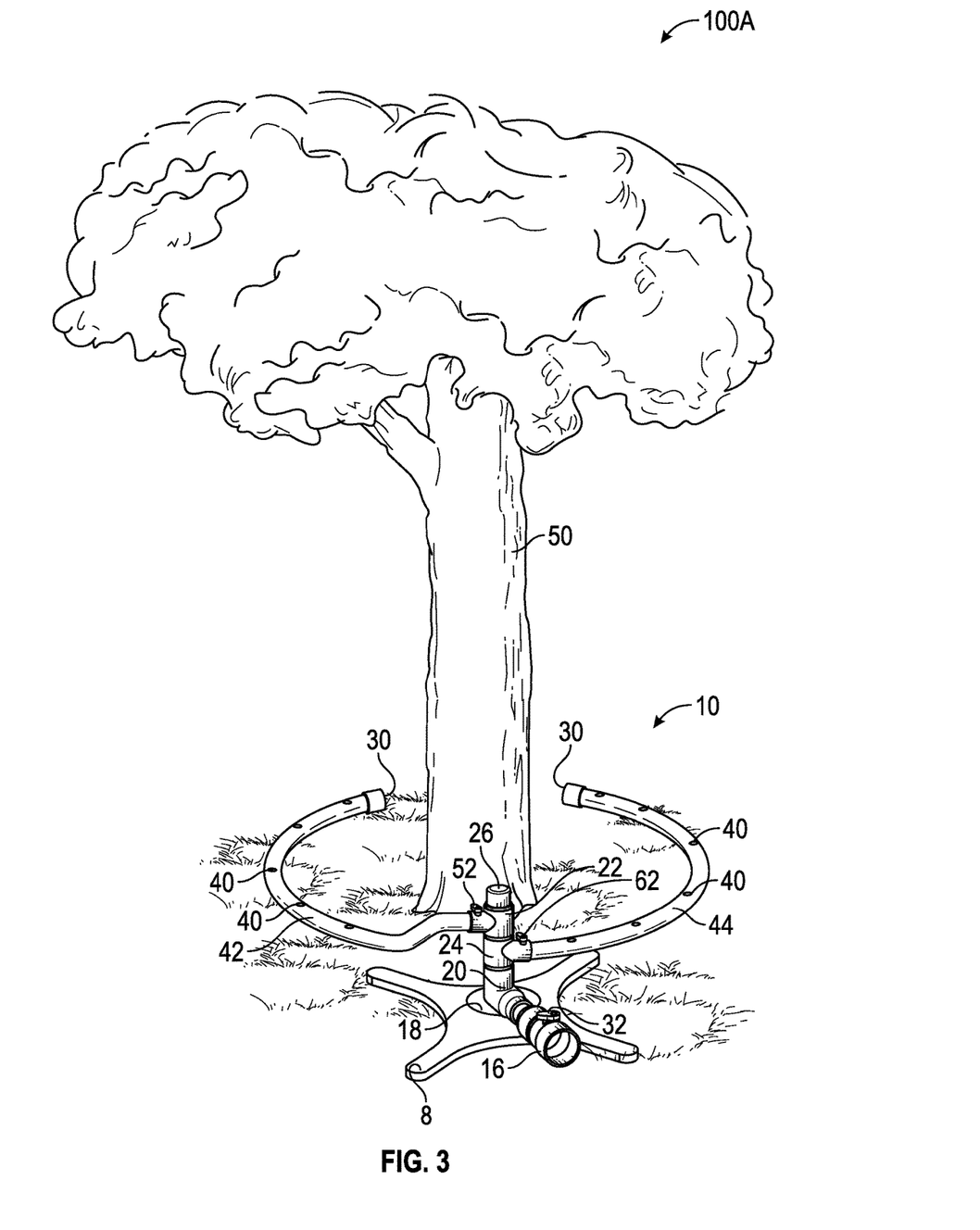
FIG. 3 is a perspective view of a tree and shrub sprinkler in an open position around a small tree in accord with one possible embodiment of the present invention.
Figure 4:
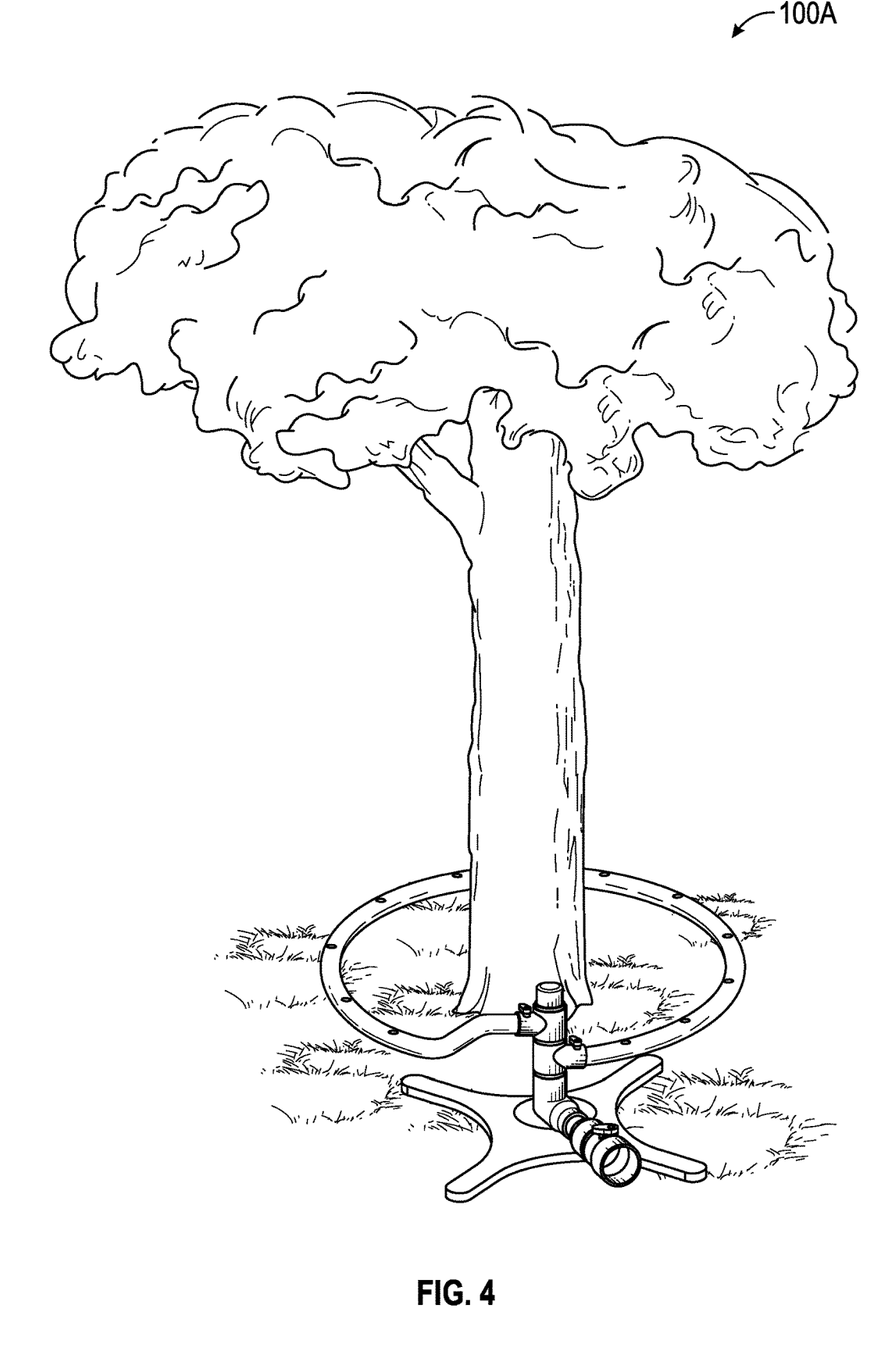
FIG. 4 is a perspective view of a tree and shrub sprinkler in a closed position surrounding a tree in accord with one possible embodiment of the present invention.

Looking now to FIGS. 3 & 4, sprinkler 100A is shown in both an open and a closed position and operates the same as the embodiment described in FIGS. 1 & 2. In this embodiment, sprinkler 100A comprises first watering arm 42 and second watering arm 44 each having a shorter length than first watering arm 12 and second watering arm 14, respectively. This allows for sprinkler 100 to be used with smaller trees or shrubs without overwatering the areas.

In operation, water connects to housing inlet 16 to provide a circular stream around tree 50. Articulating arms 12 and 14 can be adjusted to the particular tree or bush. Pivotal connections allow significant opening and closing of the arms to adjust the spray pattern as desired.

The foregoing description of embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A tree and shrub sprinkler apparatus, comprising:
   a base;
   a sprinkler housing fixedly attached to said base, said sprinkler housing defining a flowpath, said sprinkler housing comprising a housing inlet in fluid communication with a housing outlet;
   a first watering arm and a second watering arm each comprising a rigid, hollow, curved articulating member extending outwardly from said sprinkler housing, said first and second watering arm being rigid an entire length thereof, said first watering arm and said second watering arm comprising a curve at least substantially along an entire length thereof, said first watering arm and said second watering arm comprising a plurality of watering orifices, said first watering arm further comprising a first arm connection with said housing outlet for pivotal movement around said housing outlet between a first position and a second position angularly offset in a plane from said first position, said pivotal movement not being limited to pivotal movement due to threaded connections, and said second watering arm further comprising a second arm connection with said housing outlet for pivotal movement around said housing outlet between another first position and another second position angularly offset from said another first position, said pivotal movement that is not limited to pivotal movement due to threaded connections, said first arm connection and said second arm connection being in fluid communication with each other and said sprinkler housing; and
   said housing outlet and housing inlet is tubular, said housing outlet extends vertically upwardly when mounted on said base for operation, said first watering arm and said second watering arm being vertically offset from each other.

2. The tree and shrub sprinkler apparatus of claim 1, said housing outlet further comprising a hollow cylindrical member with at least a first arm orifice and at least a second arm orifice, said first arm orifice aligning with said first arm connection and said second arm orifice aligning with said second arm connection, a tubular first arm connector surrounding said first arm orifice, a tubular second arm connector surrounding said second arm orifice, whereby said housing outlet feeds water from said housing inlet to said tubular first arm connector to said first watering arm and to said tubular second arm connector to said second watering arm.

3. The tree and shrub sprinkler apparatus of claim 2, further comprising said housing outlet is oriented vertically, said first arm connection and said second arm connection comprise first and second tubular members that are co-axially aligned with said housing outlet, said first and second tubular members rotate around said housing outlet.

4. The tree and shrub sprinkler apparatus of claim 1, wherein at least one of said first watering arm and said second watering arm comprises a bended portion, said bended portion providing a clearance to allow said first watering arm and said second watering arm to pivot widely enough to receive a tree.

5. The tree and shrub sprinkler apparatus of claim 2, wherein said plurality of watering orifices further comprises nozzles spaced apart along an entire length of said first watering arm and said second watering arm.

6. The tree and shrub sprinkler apparatus of claim 2, wherein said first watering arm and said second watering arm can each rotate 360 degrees in a plane with respect to each other and with respect to said housing outlet.

7. The tree and shrub sprinkler apparatus of claim 2, further comprising a main control valve for controlling a flow of water into said tree and shrub sprinkler apparatus, a first arm valve for controlling said flow of water into said first watering arm and a second arm control valve for controlling said flow of water into said second watering arm.

8. The tree and shrub sprinkler apparatus of claim 1, wherein said first watering arm and said second watering arm are extendable.

9. The tree and shrub sprinkler apparatus of claim 1, wherein said first watering arm and said second watering arm are threadably removable from said first arm connection and said second arm connection respectively.

10. A lawn sprinkler for trees and shrubs comprising:
a sprinkler housing defining a flowpath fixedly attached to a base portion, said sprinkler housing comprising a housing inlet in fluid communication with an housing outlet;
a first watering arm extending outward from said sprinkler housing, said first watering arm having a plurality of watering orifices, said first watering arm further comprising a first arm connection pivotally attached to said housing outlet for pivotal movement with respect to said housing outlet that is not limited to pivotal movement due to a threaded connection, said first watering arm being curved and rigid an entire length thereof;
a second watering arm extending outward from said sprinkler housing and said second watering arm further comprising a second arm connection pivotally attached to said housing outlet that is not limited to pivotal movement due to a threaded connection, said second watering arm being curved and rigid an entire length thereof to permit said first watering arm and said second watering arm to pivot between a position that provides an opening for receiving said tree or said shrub to a position that encircles said tree or said shrub, said first arm connection and said second arm connection being in fluid communication with each other and said sprinkler housing, said first and second arm connection being rigid an entire length thereof; and
said housing outlet extending upwardly away from said housing inlet, said first watering arm and said second watering arm being vertically offset from each other.

11. The lawn sprinkler of claim 10, wherein said first watering arm and said second watering arm each comprise a hollow members with a closed outermost end and an open end defining a flowpath therethrough.

12. The lawn sprinkler of claim 10, wherein at least one of said first watering arm and said second watering arm comprises a bended portion, said bended portion providing a clearance to allow said first watering arm and said second watering arm to pivot wide enough to receive a tree, said first watering arm and said second watering arm comprising a curve at least substantially along their entire length.

13. The lawn sprinkler of claim 10, further comprising said housing outlet is oriented vertically, said first arm connection is tubular and said second arm connection is tubular, wherein said first and second arm connections comprise tubular members that are co-axially aligned with said housing outlet.

14. The lawn sprinkler of claim 10, further comprising said first arm connection is rotatable around said housing outlet and said second arm connection is rotatable around said housing outlet.

15. A tree and shrub sprinkler apparatus, comprising:
a base;
a sprinkler housing fixedly attached to said base, said sprinkler housing defining a flowpath, said sprinkler housing comprising a housing inlet in fluid communication with a housing outlet; and
a first watering arm and a second watering arm each comprising a rigid, hollow, curved articulating member extending outwardly from said sprinkler housing, said first and second watering arm being rigid an entire length thereof, said first watering arm and said second watering arm comprising a plurality of watering orifices, said first watering arm further comprising a first arm connection with said housing outlet for pivotal or hinged movement around said housing outlet between a first position and a second position angularly offset at least substantially in a plane from said first position and said second watering arm further comprising a second arm connection with said housing outlet for pivotal or hinged movement around said housing outlet between another first position and another second position angularly offset from said another first position, said first arm connection and said second arm connection being secured without threads to said housing outlet for said pivotal or hinged movement about said housing outlet, said first and second arm connection being rigid an entire length thereof, said housing outlet and housing inlet is tubular, said housing outlet extends vertically upwardly when mounted on said base for operation, said first watering arm and said second watering arm being vertically offset from each other, said first and second arm connection being in fluid communication with each other and said sprinkler housing.

16. The tree and shrub sprinkler apparatus of claim 15, further comprising said first arm connection and said second arm connection comprise first and second tubular members that are co-axially aligned with said housing outlet, said first and second tubular members pivot around said housing outlet, said first watering arm and said second watering arm comprising a curve at least substantially along their entire length.

17. The tree and shrub sprinkler apparatus of claim 15, said housing outlet further comprising a hollow cylindrical member with at least a first arm orifice and at least a second arm orifice, said first arm orifice aligning with said first arm connection and said second arm orifice aligning with said second arm connection, a tubular first arm connector surrounding said first arm orifice, a tubular second arm connector surrounding said second arm orifice, whereby said housing outlet feeds water from said housing inlet to said tubular first arm connector to said first watering arm and to said tubular second arm connector to said second watering arm, wherein said plurality of watering orifices further comprises at least one of a nozzle or an adjustable sprinkler head.

18. The tree and shrub sprinkler apparatus of claim 15, wherein at least one of said first watering arm and said second watering arm comprises a bended portion, said bended portion providing a clearance to allow said first watering arm and said second watering arm to pivot wide enough to receive a tree.

* * * * *